(12) United States Patent
Abatzoglou et al.

(10) Patent No.: US 8,816,899 B2
(45) Date of Patent: Aug. 26, 2014

(54) ENHANCED TARGET DETECTION USING DISPERSIVE VS NON-DISPERSIVE SCATTERER SIGNAL PROCESSING

(75) Inventors: Theagenis J. Abatzoglou, Huntington Beach, CA (US); Kenneth Ho, Los Angeles, CA (US); Leo H. Hui, Alhambra, CA (US)

(73) Assignee: Raytheon Company, Waltham, MA (US)

( * ) Notice: Subject to any disclaimer, the term of this patent is extended or adjusted under 35 U.S.C. 154(b) by 257 days.

(21) Appl. No.: 13/374,998

(22) Filed: Jan. 26, 2012

(65) Prior Publication Data

US 2013/0194130 A1    Aug. 1, 2013

(51) Int. Cl.
 *G01S 7/41* (2006.01)
 *G01S 13/524* (2006.01)

(52) U.S. Cl.
 CPC ............ *G01S 7/415* (2013.01); *G01S 13/5244* (2013.01)
 USPC .............. 342/159; 342/162; 342/90; 342/195

(58) Field of Classification Search
 CPC ... G01S 7/415; G01S 13/524; G01S 13/5244; G01S 13/726; G01S 7/292
 USPC ........ 342/159–162, 90–93, 99, 101, 194–195
 See application file for complete search history.

(56) References Cited

U.S. PATENT DOCUMENTS 5,376,940 A * 12/1994 Abatzoglou .................. 342/192
5,537,118 A * 7/1996 Appriou .......................... 342/95
5,729,465 A    3/1998 Barbaresco (Continued)

FOREIGN PATENT DOCUMENTS

DE    3723265 C1 *  7/2003 ............. G01S 13/78
DE    102004003304    *  3/2014
EP    2345907 A3 *  4/2014
GB    2504252 A  *  1/2014

OTHER PUBLICATIONS

Novak, L.M.; Sechtin, M.B.; Cardullo, M.J., "Studies of target detection algorithms that use polarimetric radar data," Aerospace and Electronic Systems, IEEE Transactions on , vol. 25, No. 2, pp. 150,165, Mar. 1989.*

(Continued)

*Primary Examiner* — John B Sotomayor
(74) *Attorney, Agent, or Firm* — Christie, Parker & Hale, LLP

(57) ABSTRACT

A method of target discrimination and identification, on a computer including a processing unit and a non-volatile storage device, from a radar signal having a plurality of radar return signals, is presented. The method includes: modeling, on the computer, the radar return signals by linear prediction to produce linear prediction equations; solving, on the computer, the linear prediction equations by the Burg algorithm to produce linear prediction coefficients for a linear prediction coefficient polynomial; computing, on the computer, roots of the linear prediction coefficient polynomial to produce scattering modes; computing, on the computer, a distance of each of the scattering modes to a unit circle; computing, on the computer, a complex envelope for each mode of the scattering modes; and selecting, on the computer, target scattering modes from among the scattering modes based on the distance of the mode to the unit circle and the complex envelope of the mode.

20 Claims, 13 Drawing Sheets
(11 of 13 Drawing Sheet(s) Filed in Color)

(56) References Cited

U.S. PATENT DOCUMENTS

| | | | |
|---|---|---|---|
| 6,091,361 A * | 7/2000 | Davis et al. | 342/378 |
| 6,498,581 B1 * | 12/2002 | Yu | 342/90 |
| 7,233,898 B2 | 6/2007 | Byrnes et al. | |
| 7,535,403 B2 | 5/2009 | Chaure et al. | |
| 8,704,887 B2 * | 4/2014 | Zeng | 348/135 |
| 2007/0159376 A1 | 7/2007 | Abatzoglou et al. | |
| 2013/0194130 A1 * | 8/2013 | Abatzoglou et al. | 342/159 |
| 2013/0257645 A1 * | 10/2013 | Penney | 342/159 |

OTHER PUBLICATIONS

Ho, K.C.; Gader, P.D., "A linear prediction land mine detection algorithm for hand held ground penetrating radar," Geoscience and Remote Sensing, IEEE Transactions on , vol. 40, No. 6, pp. 1374,1384, Jun. 2002.*

Mikhnev, V.; Vainikainen, P., "Discrimination of Near-Surface Targets in Step-Frequency Radar," Microwave Conference, 2001. 31st European , vol., No., pp. 1,4, Sep. 24-26, 2001.*

Schneider H., "Application of an Autoregressive Reflection Model for the Signal Analysis of Radar Echoes From Rotating Objects", IEEE, Apr. 11, 1988 (pp. 1236-1239).

Martin, et al., "Remote Sea Current Sensing Using HF Radar: An Autoregressive Approach", IEEE Journal of Oceanic Engineering, vol. 22, No. 1, Jan. 1997 (pp. 151-155).

Written Opinion of the International Searching Authority for International Application No. PCT/US2012/065946, filed Nov. 19, 2012, Written Opinion of the International Searching Authority mailed Jul. 24, 2013 (7 pgs.).

International Search Report for International Application No. PCT/US2012/065946, filed Nov. 19, 2012, International Search Report dated Jul. 18, 2013 and mailed Jul. 24, 2013 (4 pgs.).

* cited by examiner

ENHANCED TARGET DETECTION USING DISPERSIVE VS NON-DISPERSIVE SCATTERER SIGNAL PROCESSING

STATEMENT REGARDING FEDERALLY SPONSORED RESEARCH OR DEVELOPMENT

This invention disclosure is related to Government contract number HR0011-09-C-0036, entitled "ISIS Phase 3 Demonstrator System Contract." The U.S. Government has certain rights in this invention.

BACKGROUND

1. Field

Aspects of embodiments of the present invention are directed toward enhanced target detection using dispersive versus non-dispersive scatterer signal processing.

2. Description of Related Art

While trying to detect dismounts and other slow-moving targets, a slow-moving or stationary radar platform is limited by the radar dwell duration (radar capacity requirements) and Doppler extent of the clutter. The problem is exacerbated by factors such as short duration dwells, wind-blown ground clutter, rain clutter, and bird-flock clutter. It can be difficult to separate target from clutter returns when the clutter is spread in Doppler (both may be identified as targets). The clutter (and other non-target signals) can be Doppler spread due to factors such as: radar platform motion; the nature of the clutter, such as whether it is wind blown, rain, bird flock, sea, etc.; or other factors such as platform motion or miscalibration. The target trackers or clutter maps can be overwhelmed by a very large number of clutter-hit detections (especially in air-to-ground modes). Approaches to mitigate these problems can require throughputs that exceed the capabilities of current radar systems. They can also rely on longer radar dwells and high-order phase models.

SUMMARY

Aspects of embodiments of the present invention address these problems and other problems related to target detection and identification in the presence of dispersive and non-dispersive scatterers by detecting and identifying targets through dispersive versus non-dispersive signal separation analysis. In addition, aspects of embodiments of the present invention are directed to separating the dispersive and non-dispersive signals by analyzing the Further aspects of embodiments of the present invention are directed toward discriminating between dispersive clutter-like returns versus non-dispersive target-like returns using the location of the roots of the linear prediction coefficient polynomial. In addition, aspects of embodiments of the present invention are directed toward fast implementations of this discrimination algorithm. Still further aspects of embodiments of the present invention enhance target detection by using short dwells to achieve required radar capacity. In addition, aspects of embodiments of the present invention are directed to providing dismount detection at low mean Doppler velocity (MDV). Further aspects of embodiments of the present invention are directed toward applying the Burg extrapolation algorithm to improve Doppler resolution by a factor of 3.

In an exemplary embodiment of the present invention, a technique for separating non-dispersive/specular target scattering components from dispersive, clutter like, radar returns is provided. Scatterers may be categorized as dispersive (non-stationary clutter) versus non-dispersive (target) depending on factors such as whether their corresponding roots of the linear prediction coefficient polynomial are inside versus on the unit circle. Roots on the unit circle are indicative of target specular returns, while roots inside the unit circle are characteristic of non-stationary clutter (e.g., wind, rain, sea) returns. Signal separation may be attained via signal reconstruction after removing dispersive components or via data extrapolation using linear prediction equations. By eliminating most clutter, subsequent target trackers using the filtered radar return data can operate more efficiently.

In an exemplary embodiment of the present application, a method of target discrimination and identification, on a computer including a central processing unit (CPU) and a non-volatile storage device, from a radar signal including a plurality of radar return signals, is provided. The method includes: modeling, on the computer, the radar return signals by linear prediction to produce linear prediction equations; solving, on the computer, the linear prediction equations by the Burg algorithm to produce linear prediction coefficients for a linear prediction coefficient polynomial; computing, on the computer, roots of the linear prediction coefficient polynomial to produce scattering modes; computing, on the computer, a proximity of each of the scattering modes to a unit circle; computing, on the computer, a complex envelope for each mode of the scattering modes; and selecting, on the computer, target scattering modes from among the scattering modes based on the proximity of the mode to the unit circle and the complex envelope of the mode.

The method may further include selecting, on the computer, target radar return signals from among the radar return signals that correspond to the target scattering modes, to produce cleansed radar return signals.

The method may further include reconstructing, on the computer, the radar signal to include only the cleansed radar return signals.

The method may further comprising computing, on the computer, a proximity of each of the scattering modes to a zero Doppler frequency, wherein the selecting of the target scattering modes is further based on the proximity of the mode to the zero Doppler frequency.

The computing of the roots of the linear prediction coefficient polynomial may include approximating the roots with a fast Fourier transform.

The selecting of the target scattering modes based on the proximity of the mode to the unit circle may include approximating the proximity of the mode to the unit circle by applying a linear approximation about a respective one of the approximated roots.

The selecting of the target scattering modes based on the proximity of the mode to the unit circle may include basing the selecting on whether a distance of the mode to the unit circle is less than a first threshold value.

The selecting of the target scattering modes based on the complex envelope of the mode may include basing the selecting on whether the complex envelope is greater than a second threshold value.

The method may further include not selecting those scattering modes that correspond to a zero Doppler frequency when the radar signal comprises stationary clutter radar return signals.

The modeling of the radar return signals may be done in a slow time domain.

The modeling of the radar return signals may be done in a fast frequency domain.

In another exemplary embodiment of the present invention, a system for target discrimination and identification from a radar signal including a plurality of radar return signals is provided. The system includes a processor, a non-volatile storage device for storing the radar return signals, and computer-readable instructions for executing on the processor. The instructions constitute signal processing algorithms for discriminating between dispersive and non-dispersive scatterers from the radar signal. The algorithms are configured to model the radar return signals by linear prediction to produce linear prediction equations, solve the linear prediction equations by the Burg algorithm to produce linear prediction coefficients for a linear prediction coefficient polynomial, compute roots of the linear prediction coefficient polynomial to produce scattering modes, compute a proximity of each of the scattering modes to a unit circle, compute a complex envelope for each mode of the scattering modes, and select target scattering modes from among the scattering modes based on the proximity of the mode to the unit circle and the complex envelope of the mode.

The algorithms may be further configured to select target radar return signals from among the radar return signals that correspond to the target scattering modes, to produce cleansed radar return signals.

The algorithms may be further configured to reconstruct the radar signal to include only the cleansed radar return signals.

The algorithms may be further configured to compute a proximity of each of the scattering modes to a zero Doppler frequency, and to further select the target scattering modes based on the proximity of the mode to the zero Doppler frequency.

The algorithms may be further configured to approximate the roots of the linear prediction coefficient polynomial using a fast Fourier transform.

The algorithms may be further configured to approximate the proximity of the mode to the unit circle by applying a linear approximation about a respective one of the approximated roots.

In yet another exemplary embodiment of the present invention, a method of fast target discrimination, on a signal processor, from a linear prediction coefficient polynomial, is provided. The method includes approximating, on the signal processor, roots of the linear prediction coefficient polynomial using a fast Fourier transform.

The method may further include approximating, on the signal processor, proximities of the approximated roots to a unit circle by applying a linear approximation about each of the approximated roots.

The method may further include selecting, on the signal processor, approximated roots whose approximated proximities to the unit circle are less than a first threshold value.

According to aspects of embodiments of the present invention, target separation principles are provided that can also be applied to areas such as radio frequency interference (RFI) mitigation, waveguide multipath elimination, periodic calibration harmonics suppression, etc.

BRIEF DESCRIPTION OF THE DRAWINGS

The patent application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention and, together with the description, serve to explain aspects and principles of the present invention.

DETAILED DESCRIPTION

Figure 1:
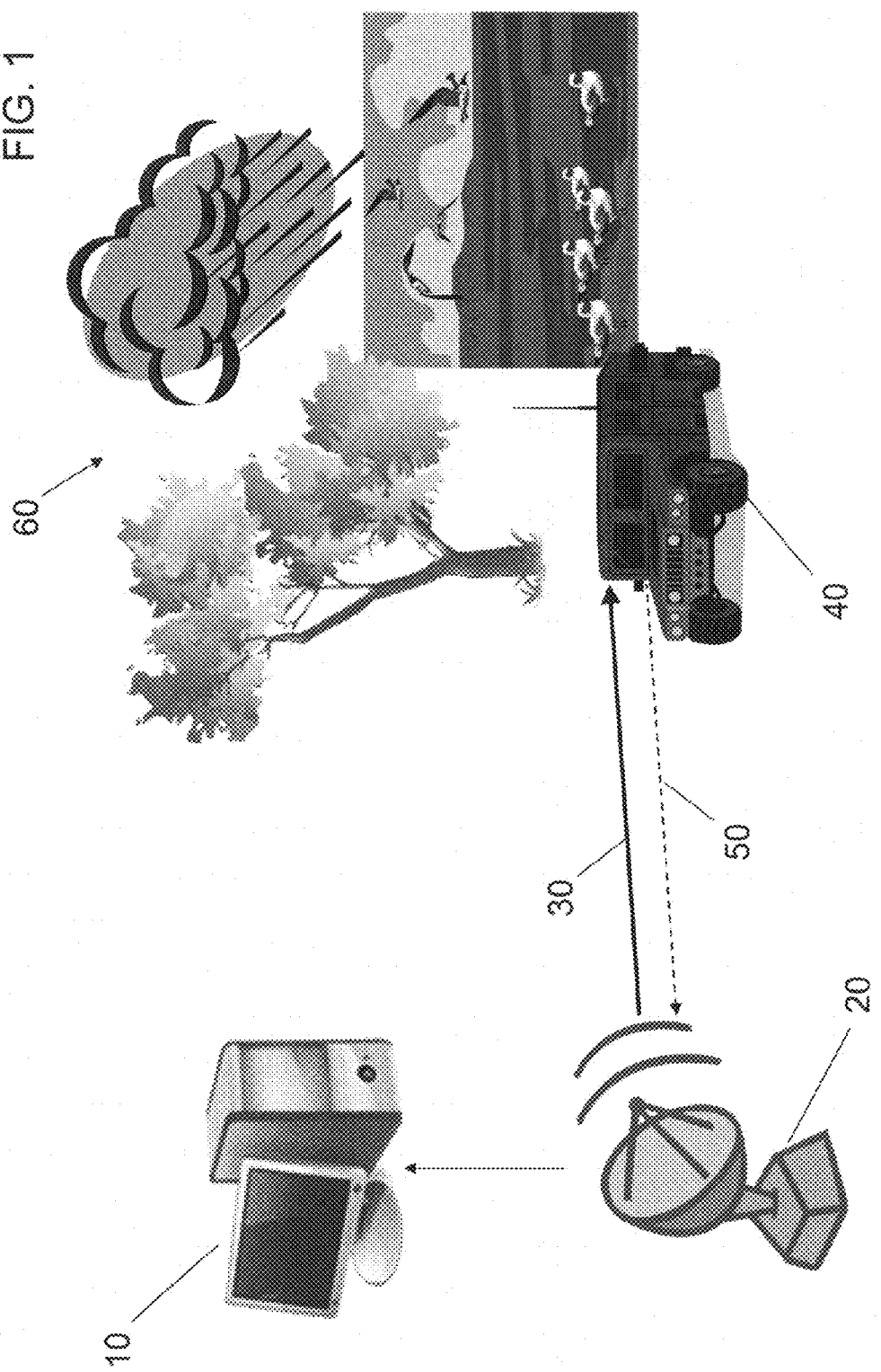
FIG. 1 illustrates an exemplary system, including signal processing algorithms for discriminating between dispersive and non-dispersive scatterers, according to an embodiment of the present invention.

Hereinafter, exemplary embodiments of the invention will be described in more detail with reference to the accompanying drawings. In the drawings, like reference numerals refer to like elements throughout. While the exemplary embodiments are described in terms of signals in the slow time domain (that is, pulse-to-pulse time samples), the techniques are equally valid in the fast frequency domain (that is, the Fourier transform of the fast time domain, e.g., samples within a radar pulse) to one of ordinary skill in the art.

In general, the principle of discriminating between dispersive and non-dispersive signals applies to a wide variety of transmitted radar waveforms, dwell durations, waveform bandwidths, etc. As a non-limiting example, certain monitoring and tracking applications require the detection of dismounts and other slow-moving targets in the presence of various types of clutter while using short dwell durations. Short dwell durations, which can be 25-30 milliseconds (msec) with current radar capacity considerations, limit resolution by limiting the number of pulses and that can be transmitted, received, and processed. Longer dwell durations, on the other hand, such as longer than 30 msec, can lead to decorrelation of the dismount Doppler returns (which allows separation of different body parts). The relatively short dwell durations can limit comparable Doppler filter resolution in the presence of significant ground clutter to around 0.9 meters per second (m/sec). This can also make it difficult to discern dismount leg and arm return signals, which can exhibit Doppler velocities between 0 and 3 m/sec.

Embodiments of the present invention are directed to discriminating between the dispersive and non-dispersive signals, for instance, radar return signals. As a non-limiting example, embodiments of the present invention help overcome the limitations of the short dwell durations discussed above by making use of the Burg Algorithm to extrapolate the data and improve Doppler resolution by a factor of 3 (that is, reduce the mean Doppler velocity (MDV) resolution to 0.3 m/sec). This enhancement helps in detecting slow-moving targets and separating them from ground-clutter, wind-blown clutter, rain clutter, bird-flock clutter, and sea clutter.

Briefly, according to an exemplary embodiment, radar returns are modeled by linear prediction (that is, predicting future values of the radar signals based on linear functions of the previous samples). This produces linear prediction equations that are solved by the Burg Algorithm (a stable routine available on commercial sources such as Matlab). The roots of the corresponding linear prediction coefficient polynomial are then computed to produce scattering modes (one per root). The scattering modes are then evaluated in terms of their proximity to the unit circle and their power, with target specular scatterers being retained as having modes close to the unit circle and with sufficient power (and not corresponding to zero Doppler). Non-stationary clutter modes are excluded based on their modes being away from the unit circle or having insufficient power. This technique is superior to approaches that rely on ground clutter spread to eliminate false detections but have no provisions for sea clutter, rain clutter, or flocks of birds to be eliminated based on factors such as their dispersiveness.

Further embodiments provide an algorithm to discriminate between dispersive clutter-like returns and non-dispersive target-like scatterers. This algorithm can be applied to a wide variety of radar signal waveforms, waveform bandwidths, and dwell durations. This algorithm is based on computing the roots of the linear prediction coefficient polynomial that arise from the Burg algorithm, finding those roots that are sufficiently close to the unit circle, and determining which roots have strong enough envelope power to meet the detection criteria. Roots close to the unit circle correspond to a non-dispersive target scatterer. Such roots correspond to returning electromagnetic energy that exhibits pure (or close to pure) resonance. A root further away from the unit circle corresponds to a dispersive clutter-like return and is rejected in the algorithm. Such roots correspond to returning electromagnetic energy with decaying resonance (as is exhibited in nature from such natural non-stationary clutter, including sea, wind-blown clutter, and birds). The algorithm also rejects the root closest to zero Doppler as this corresponds to ground (stationary) clutter (that is, their corresponding radar signals are treated as stationary clutter radar return signals).

Traditional root-finding algorithms are very computationally expensive. Accordingly, still further embodiments of the present invention provide a faster root-finding approach based on a fast Fourier transform (FFT) and distance approximation to the unit circle that achieves desired accuracy compared to the traditional root-finding algorithms.

FIG. 1 illustrates an exemplary system 10, including a signal processor or computer having a processor or central processing unit (CPU), a non-volatile storage device (such as a disk drive) for storing instruction code (computer-readable instructions) and data (such as radar signals), the instruction code including signal processing algorithms for discriminating between dispersive and non-dispersive scatterers, according to an embodiment of the present invention.

Referring to FIG. 1, radar 20 (for example, a vehicle-mounted Doppler pulse radar) sends out signals (pulses) 30, which reflect off various scatterers such as a vehicle 40 and are returned as (much weaker) Doppler-shifted (and usually non-dispersive) signals 50 to the radar 20. The radar sweeps (for example, in a circular motion) a portion of the surroundings, a particular target (such as the vehicle 40) staying in the radar's signal beam for a particular dwell time (based on factors such as the speed of the radar sweeping and the relative size of the vehicle 40 to the radar's search path), during which a corresponding number of pulses are transmitted to, reflected off, and received from the target. In addition, still other (usually dispersive) signals reflect off of other scatterers such as various clutter 60 (including ground clutter such as trees, weather clutter such as rain, birds, or sea clutter). The radar 20 receives the return signals 50 and sends them to the system 10 for processing by the CPU using the signal processing algorithms for discriminating between dispersive and non-dispersive scatterers.

As described above, the radar return signals include the desired (non-dispersive) target signals 50 and the undesired (dispersive) clutter signals 60 along with noise (such as thermal noise). The radar signals can be processed into various scattering modes (representing different resonances). The goal is to discriminate between the target non-dispersive scatterers and the clutter (plus thermal noise), which can also produce scattering modes.

The signal processing algorithms for discriminating between dispersive and non-dispersive scatterers detect characteristics in the Doppler spectrum of target signatures, such as those from the vehicle 40. These target signatures differ from the Doppler spectral signatures of various clutter, such as ground clutter (for example, wind blown or stationary), sea clutter, weather clutter, and "angel" clutter (e.g., birds or insects). Using a dispersive (i.e., clutter-like) vs. non-dispersive (i.e., target-like) approach (described in more detail below), the signal processing algorithms for discriminating between dispersive and non-dispersive scatterers separates the target 40 from the various clutter 60.

Figure 2:
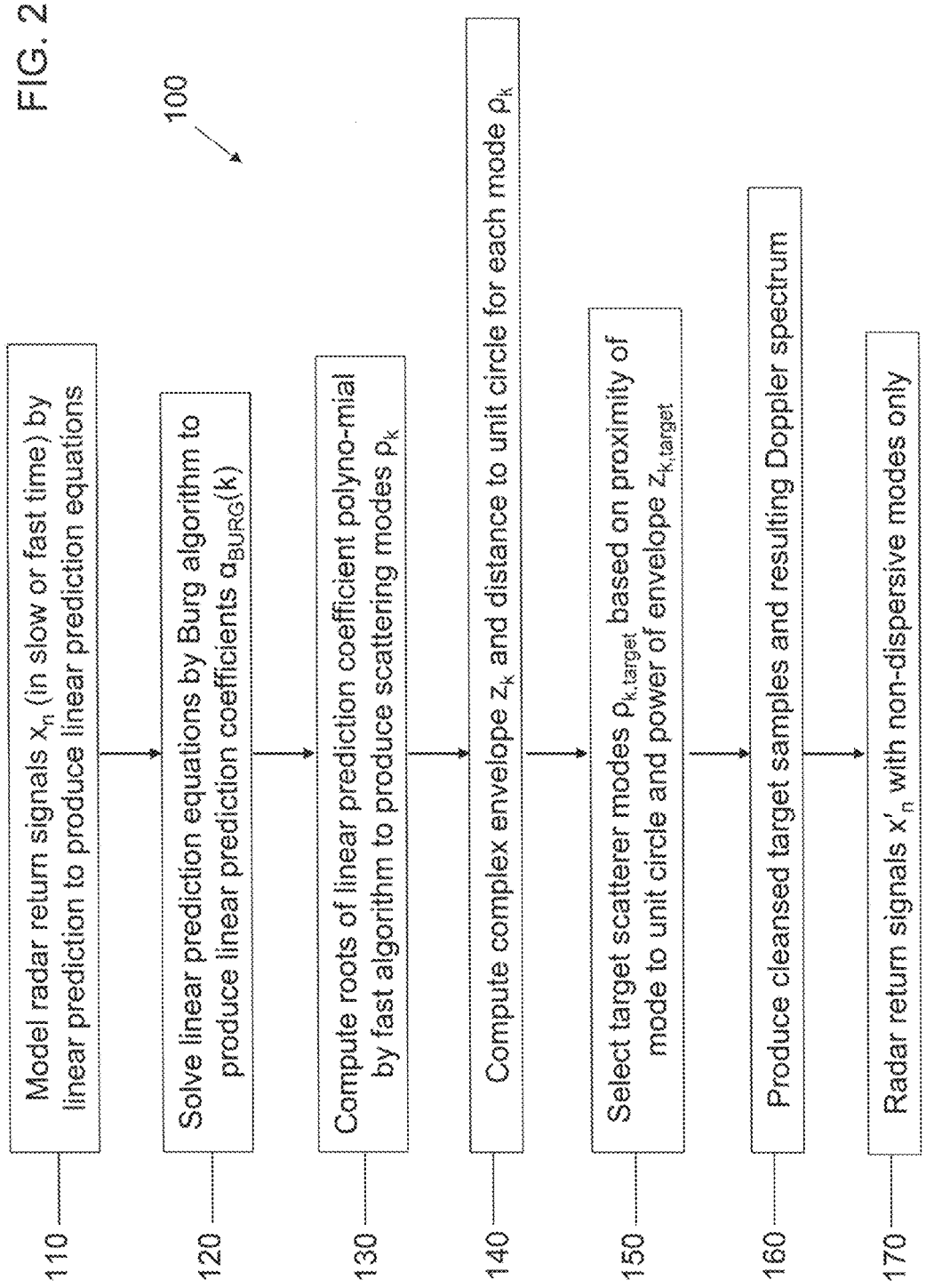
FIG. 2 is a functional block diagram of an exemplary method of dispersive versus non-dispersive signal separation for target discrimination and identification according to an embodiment of the present invention.

FIG. 2 is a functional block diagram of an exemplary method 100 of dispersive versus non-dispersive signal separation for target discrimination and identification according to an embodiment of the present invention.

Referring to FIG. 2, in step 110, range/Doppler compressed radar return signals $x_n$ are modeled by linear prediction to produce linear prediction equations. The radar return signals $x_n$ can be slow time (that is, between radar pulses) or fast time (within a radar pulse). In step 120, these linear prediction equations are solved by the Burg algorithm to produce K linear prediction coefficients $\alpha_{BURG}$ (k). These linear prediction coefficients $\alpha_{BURG}$ (k) define a K degree linear prediction coefficient polynomial, namely $$\rho^K - \sum_{k=1}^{K} \alpha_{BURG}(k)\rho^{k-1}.$$

In step 130, the roots of this linear prediction coefficient polynomial are computed or approximated by a fast algorithm to produce scattering modes (resonances) $\rho_k$. An exemplary fast algorithm according to an embodiment of the present invention is described below. Each of these modes $\rho_k$ corresponds to a return signal from a scatterer, such as that produced by a target or a particular instance of clutter. Each of these modes $\rho_k$ also corresponds to a complex number on or inside of the unit circle.

In step 140, the distance of each scattering mode $\rho_k$ to the unit circle is computed (e.g., approximated). The complex envelope $z_k$ for the scattering mode $\rho_k$ is also computed. The distance from the mode to the unit circle (i.e., the proximity to the unit circle, which may include approximated proximities) may be used as an indication of the resonance of the return signal. Generally, modes on the unit circle represent non-dispersive scatterers, which are often associated with targets, while modes inside the unit circle represent dispersive scatters, which are usually associated with clutter. The envelope power of a scatterer can also be an indicator of whether the scatterer represents a target or clutter. Generally, target-like scatterers exhibit greater envelope power than clutter-like scatterers, with the exception of ground clutter return at the Doppler frequency defined by the radar platform motion (which is referred to in this disclosure as "zero Doppler frequency," or just "zero Doppler").

In step 150, the target-like scatterer modes $\rho_{k,target}$ are selected from among all the modes $\rho_k$ based on factors such as proximity to the unit circle, envelope power, and proximity to zero Doppler. Modes $\rho_{k,target}$ on the unit circle (i.e., non-dispersive), and having sufficient envelope power, can be regarded as exhibiting pure resonance, a characteristic of a target-like scatterer. In addition, modes almost on the unit circle (say, within a certain threshold, such as for all but one sample) can be treated as representing a target scatterer, as the incidental deviation is more likely a result of other factors than the more predictable decaying resonance of a dispersive clutter scatterer. However, a stationary clutter Doppler root on the unit circle (i.e., zero Doppler) can be discarded as being deterministic. Likewise, modes inside the unit circle (i.e., dispersive), or those having insufficient envelope power, can be regarded as exhibiting decaying resonance, a characteristic of a clutter-like scatterer (such as wind-blown clutter, rain, sea, or birds).

Figure 3:
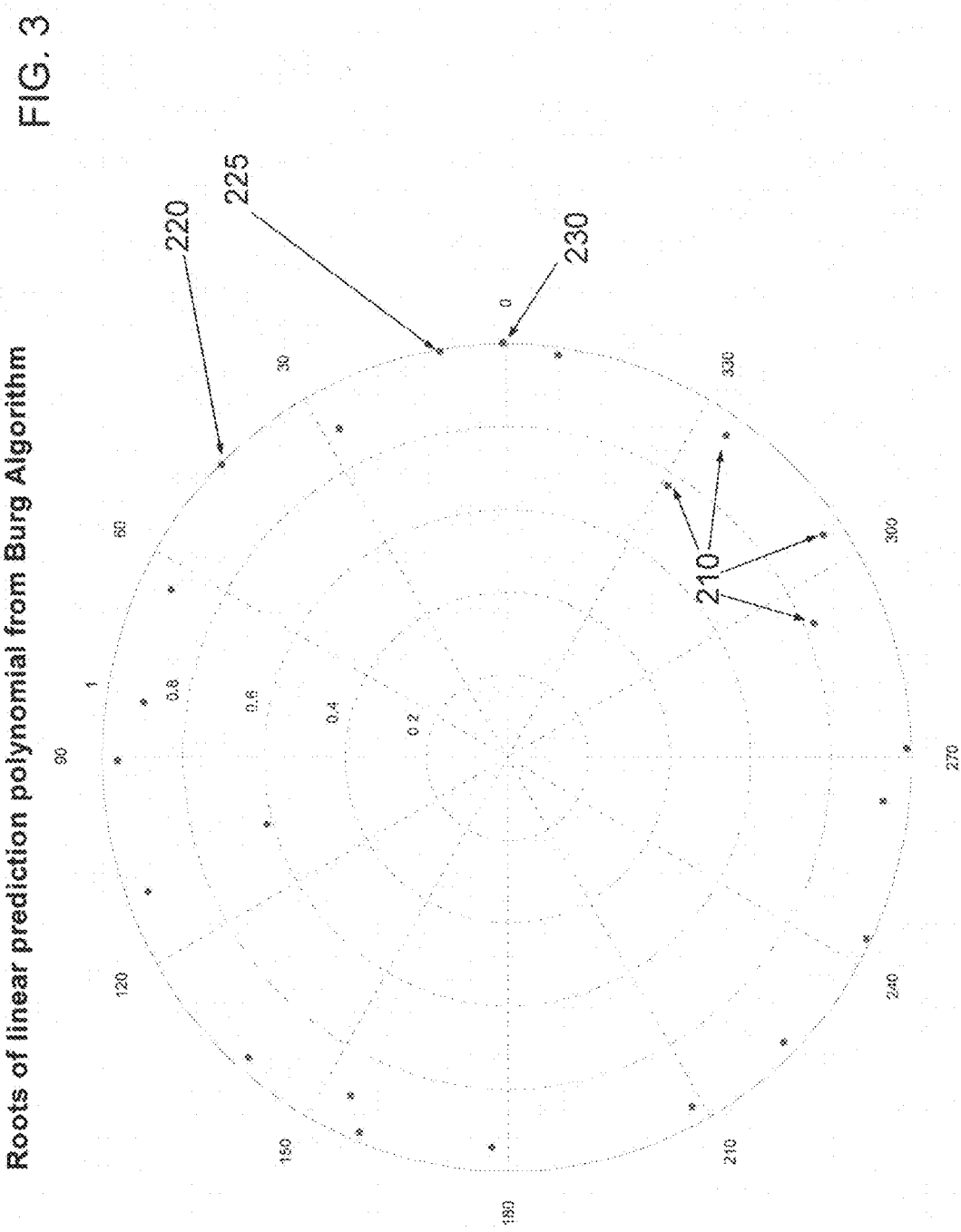
FIG. 3 is a graph of the roots of the linear prediction coefficient polynomial from the Burg Algorithm as plotted on the unit circle according to an embodiment of the present invention.

FIG. 3 is a graph of the roots of the linear prediction coefficient polynomial from the Burg Algorithm as plotted on the unit circle according to an embodiment of the present invention.

Referring to FIG. 3, examples of the three different modes described in step 150 above can be observed. For example, modes 210 represent example modes inside the unit circle; these correspond to non-stationary clutter (dispersive scatterers). On the other hand, modes 220 and 225 are on the unit circle, and correspond to targets (non-dispersive scatterers). In this case, mode 220 corresponds to a target moving at relative velocity of 2.5 m/sec while mode 225 corresponds to a target moving at a relative velocity of 0.5 m/sec. An exception to the unit circle rule is mode 230, which corresponds to stationary clutter at zero Doppler frequency.

Impulse response (IPR) can also be used to help in the categorization of modes. IPR refers to the spectral shape (range/Doppler) of a scatterer after it is processed by a Fourier transform in either the fast frequency or slow time domains. Those modes with sharp IPRs are more indicative of non-dispersive scatterers (such as targets), while IPRs that widen are more indicative of dispersive scattering components (such as non-stationary clutter, radio frequency interference (RFI), etc.)

Referring back to the method 100 of FIG. 2, in step 160, the target samples $x_n$ are cleansed (i.e., cleansed radar return signals), to remove those samples whose modes appear to be more like those of non-stationary clutter (that is, dispersive scattering components). The return signals file is then reconstructed to include only those samples $x'_n$ that appear to represent targets (i.e., the target radar return samples), and the resulting Doppler spectrum is determined. Finally, in step 170, this leaves only those samples $x'_n$ corresponding to non-dispersive modes, thus separating and identifying those samples $x'_n$ that have characteristics similar to those of non-dispersive target-like scatterers. Such samples may, for instance, in a non-limiting example, be used in post detection integration (PDI) procedures, such as feeding the samples $x'_n$ to a multiple hypothesis tracker (MHT) for further tracking. However, this is only an exemplary use of such signals, and the present invention is not limited thereto. By reconstructing the radar signals after removing the dispersive components, and by using the linear prediction equations to extrapolate the data from the available samples, signal separation is significantly improved over existing techniques processing the same number of samples.

Exemplary Signal Processing

The radar return signals can be thought of as discrete pulses, which are being continually created by the radar as it sends out signals and receives back reflected signals from the scatterers. Assume there are K such scatterers, numbered from 1 to K. Each such pulse is a range/Doppler compressed sample. Numbering the pulses from $-N$ to $+N$, the $n^{th}$ return signal $x_n$ in slow time for pulse n from the different scatterers can be represented as $$x_n = \sum_k z_k e^{j2\pi nTf_k} + c_n + u_n,$$

where $z_k$=the scatterer complex envelope of the $k^{th}$ scatterer, $f_k$=the Doppler frequency (mean Doppler velocity) of the $k^{th}$ scatterer, T=sampling period (fast time or slow time) or inter-pulse period (IPP, slow time), $c_n$=the clutter return from wind blown, weather, sea, birds (RFI), and $u_n$=the wideband thermal noise.

A single value $z_k$ for the $k^{th}$ scatterer is more appropriate for non-dispersive scatterers, such as man-made targets, that exhibit relatively slow time decorrelation in their radar return signals. It should be noted that $z_k$ can be replaced with $z_{k,n}$ (that is, one that varies with time) for dispersive scatterers (e.g., wind-blown clutter, rain clutter, sea clutter, bird's wing, RFI, waveguide absorption, scintillation effects, decaying resonances, etc.), which exhibit faster time decorrelation in their signal returns.

Referring again to the method 100 in FIG. 2, in step 110, the return signals $x_n$ are modeled by linear prediction to produce the linear predication equations, which in step 120 are solved by the Burg algorithm to produce linear prediction coefficients $\alpha_{BURG}(k)$ for k=1, 2, . . . , K. These linear prediction coefficients define a corresponding K degree linear prediction coefficient polynomial, whose K complex roots $\rho_k$ are determined in step 130. Each such root $\rho_k$ represents a scattering mode from a $k^{th}$ scatterer.

In step 140, the complex envelope $z_k$ as well as the distance to the unit circle is computed for each mode $\rho_k$. Then, in step 150, the target scatterer modes $\rho_{k,target}$ and their corresponding complex envelopes $z_{k,target}$ are selected from the scatterer modes $\rho_k$ based on factors such as the closeness of the mode $\rho_k$ to the unit circle and the power of the complex envelope $z_k$. The target scatterer modes $\rho_{k,target}$ and their complex envelopes $z_{k,target}$ are then used in step 160 to produce the cleansed target samples (corresponding to only the non-dispersive modes) and the resulting Doppler spectrum.

Example data from embodiments of the present invention will now be presented. The embodiments were directed to testing different clutter environments, namely sea and rain (weather). Similar data was produced when testing other clutter, such as bird or wind-blown clutter.

Burg Algorithm

The Burg algorithm is a recursion on the model order K, where K≈N/3, N is the number of radar return signals, and the linear prediction is defined in the forward direction for the $n^{th}$ radar return signal $y_n$ as $$y_n = \sum_{k=1}^{K} \beta_{K+1-k,K} y_{n-k}; \quad n = K+1, K+2, \ldots, N$$

and in the backward direction as $$y_n = \sum_{k=1}^{K} \bar{\beta}_{K+1-k,K} y_{n-k}; \quad n = 1, 2, \ldots, N-K,$$

where each of the β terms are Burg linear prediction coefficients. The β terms can be solved by the Burg Algorithm using model order recursion to derive each of the $\beta_{k,K}(=\beta_k)$. This, in turn, defines the linear prediction coefficient polynomial $$\rho^K - \sum_{k=1}^{K} \beta_K \rho^{k-1} = 0.$$

Let $\rho_1, \rho_2, \ldots, \rho_K$ represent the K roots (modes) of this linear prediction coefficient polynomial.

Complex Envelope Calculation

Let $$x_{-\frac{N}{2}}, x_{-\frac{N}{2}+1}, \ldots, x_{\frac{N}{2}}$$

represent the N+1 radar return signals. Assume $\rho_1, \rho_2, \ldots, \rho_K$ are the K roots (modes) of the linear prediction coefficient polynomial from above. Let $f_1, f_2, \ldots, f_K$ represent their corresponding (mean) Doppler frequencies of each of these modes (scatterers). Define the radar return column vector $$\vec{x} = \begin{bmatrix} x_{-\frac{N}{2}} \\ x_{-\frac{N}{2}+1} \\ \vdots \\ x_{\frac{N}{2}} \end{bmatrix},$$

the complex envelope mode vector $$\vec{z} = \begin{bmatrix} z_1 \\ z_2 \\ \vdots \\ z_K \end{bmatrix},$$

and the Doppler phase steering matrix $$E(f_1, f_2, \ldots, f_K) = \begin{bmatrix} e^{-j2\pi f_1(-\frac{N}{2})IPP} & e^{-j2\pi f_2(-\frac{N}{2})IPP} & \ldots & e^{-j2\pi f_K(-\frac{N}{2})IPP} \\ e^{-j2\pi f_1(-\frac{N}{2}+1)IPP} & e^{-j2\pi f_2(-\frac{N}{2}+1)IPP} & \ldots & e^{-j2\pi f_K(-\frac{N}{2}+1)IPP} \\ \vdots & \vdots & \ddots & \vdots \\ e^{-j2\pi f_1 \frac{N}{2} IPP} & e^{-j2\pi f_2 \frac{N}{2} IPP} & \ldots & e^{-j2\pi f_K \frac{N}{2} IPP} \end{bmatrix}$$

Then $\vec{x} = E(f_1, f_2, \ldots, f_K)\vec{z}$. If we label the pseudoinverse of $E(f_1, f_2, \ldots, f_K)$ as $E^+(f_1, f_2, \ldots, f_K)$, then the complex envelope column vector $$\vec{\tilde{z}} = \begin{bmatrix} \tilde{z}_1 \\ \tilde{z}_2 \\ \vdots \\ \tilde{z}_K \end{bmatrix}$$

can be expressed as $\vec{\tilde{z}} = E^+(f_1, f_2, \ldots, f_K)\vec{x}$.

Fast Root Finding Approach for Burg Linear Prediction Coefficient Polynomial

Solving for roots of a high-order polynomial, such as the Burg linear prediction coefficient polynomial defined above, may be too computationally intensive for particular applications. Accordingly, what follows is a fast root finding method for such polynomials that works by performing a fast Fourier transform (FFT). An FFT is an efficient algorithm for performing a discrete Fourier transform, in this case over the Burg linear prediction coefficients.

Figure 4:
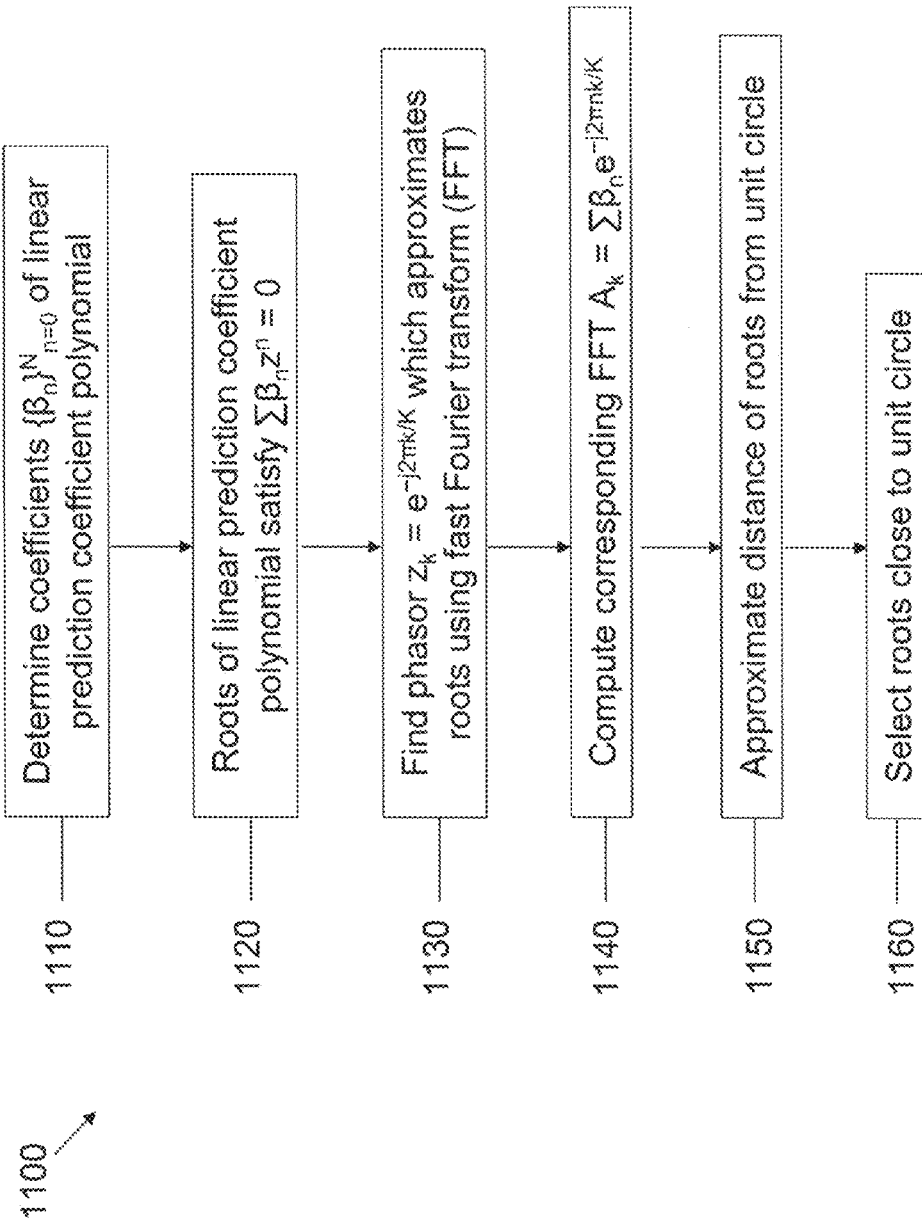
FIG. 4 is a functional block diagram illustrating an exemplary method of efficiently finding or approximating roots of the linear prediction coefficient polynomial (derived from an application of the Burg Algorithm) according to an embodiment of the present invention.

FIG. 4 is a functional block diagram illustrating an exemplary method 1100 of efficiently finding or approximating roots of the linear prediction coefficient polynomial (derived from an application of the Burg Algorithm) according to an embodiment of the present invention.

Referring to FIG. 4, in step 1110, the linear prediction coefficient polynomial is initialized. That is, the Burg linear prediction coefficients $\alpha_{BURG}(n)$ are determined (e.g., computed or copied) for each n. Without loss of generality, let $\alpha_{BURG}(n)$ be denoted as $\beta_n$. Assume that there are N+1 such coefficients $\beta_n$, with n=0, 1, ..., N.

Next, in step 1120, these N+1 linear prediction coefficients $\beta_n$ define a polynomial $$\sum_{n=0}^{N} \beta_n z^n.$$

The problem thus reduces to a fast root finding approach for solving $$\sum_{n=0}^{N} \beta_n z^n = 0$$

In step 1130, let $z_k = e^{-j2\pi k/K}$ represent the corresponding phasor for approximating roots to $$\sum_{n=0}^{N} \beta_n z^n = 0$$

using the corresponding FFT $$A_k = \sum_{n=0}^{N} \beta_n e^{-j2\pi nk/K}.$$

That is, the phasors $z_k$ approximate roots to the linear prediction coefficient polynomial using the FFT $A_k$ by making the FFT $A_k$ approximately zero.

In step 1140, the corresponding FFT response $$A_k = \sum_{n=0}^{N} \beta_n e^{-j2\pi nk/K}$$

is computed using a conventional FFT algorithm. The FFT provides a very efficient way to concurrently carry out the root approximation over all of the, different roots. Efficient FFT algorithms are well known to those of ordinary skill in the art.

In step 1150, after the roots have been sufficiently approximated in steps 1130 and 1140, the distances of the corresponding roots to the unit circle are approximated by the linear approximation formula $$\delta_k = \frac{A_k}{e^{-j2\pi nk/K} \sum_{n=0}^{N} \beta_n n e^{-j2\pi(n-1)k/K}}.$$

In step 1160, those roots that are close to the unit circle are selected. As discussed above in method 100 of FIG. 2, these roots likely represent non-dispersive scatterers, that is, potential targets. Given the different approximations used in identifying these potential targets and their corresponding roots and distances from the unit circle, some type of threshold criteria can be used here. For example, those roots with corresponding distance approximations to the unit circle of less than 0.05 could be selected as being on the unit circle. What follows is an example application of this method 1100, with reference to FIG. 5.

Figure 5:
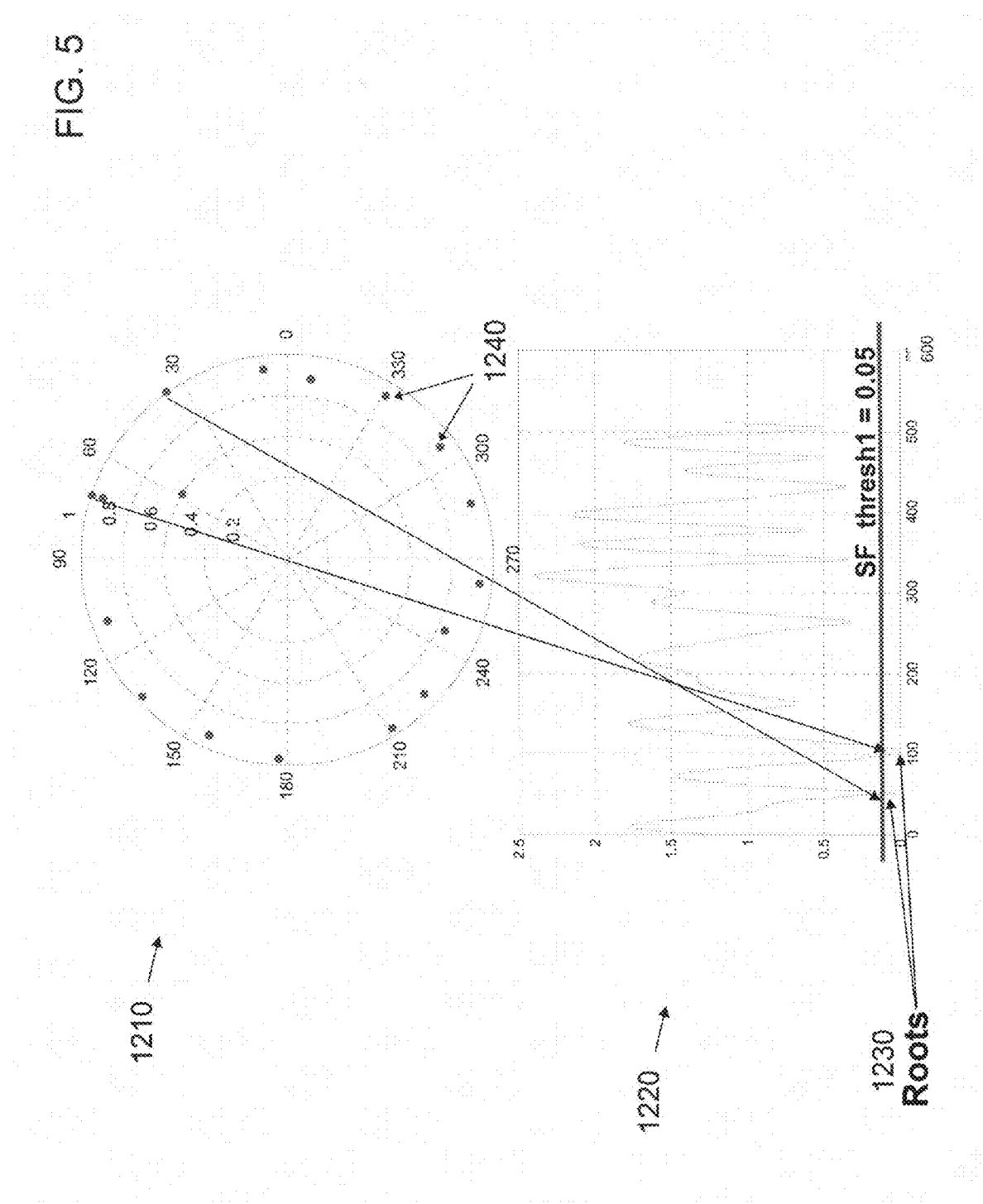
FIG. 5 shows an application of the method of FIG. 4 to some exemplary radar return signals that have been processed through the method of FIG. 2.

FIG. 5 shows an application of the method 1100 of FIG. 4 to some exemplary radar return signals that have been processed through the method 100 of FIG. 2.

Referring to FIG. 5, two graphs 1210 and 1220 are shown. Graph 1210 shows a plot of the unit circle with the corresponding approximated roots (for example, roots 1240) of the linear prediction coefficient polynomial used in the application of the method 100 of FIG. 2 to generate the data for graphs 1210 and 1220. Further, graph 1220 shows a plot of the distance from the unit circle to different roots of the linear prediction coefficient polynomial. In particular, two roots 1230 are identified in graph 1220 (with lines extending from their corresponding roots in graph 1210) as being within the threshold distance (in this case, 0.05) of the unit circle. Accordingly, the two roots 1230 are identified as likely corresponding to non-dispersive scatterers (and not to zero Doppler frequency), thereby making them potential targets identified by the methods 100 and 1100 of FIGS. 2 and 4, respectively.

Sea Clutter

Sea clutter depends on factors such as the wind direction, velocity, and sea state. In an exemplary embodiment, sea clutter returns are modeled by the K-distribution in amplitude and in Doppler as a superposition of the Bragg scattering (water surface waves responding to radar waves) spectrum and whitecap (wind-generated waves at the water surface) spectrum for vertical polarization. Both Bragg scattering spectrum and whitecap spectrum have a Gaussian shape.

Figure 6:
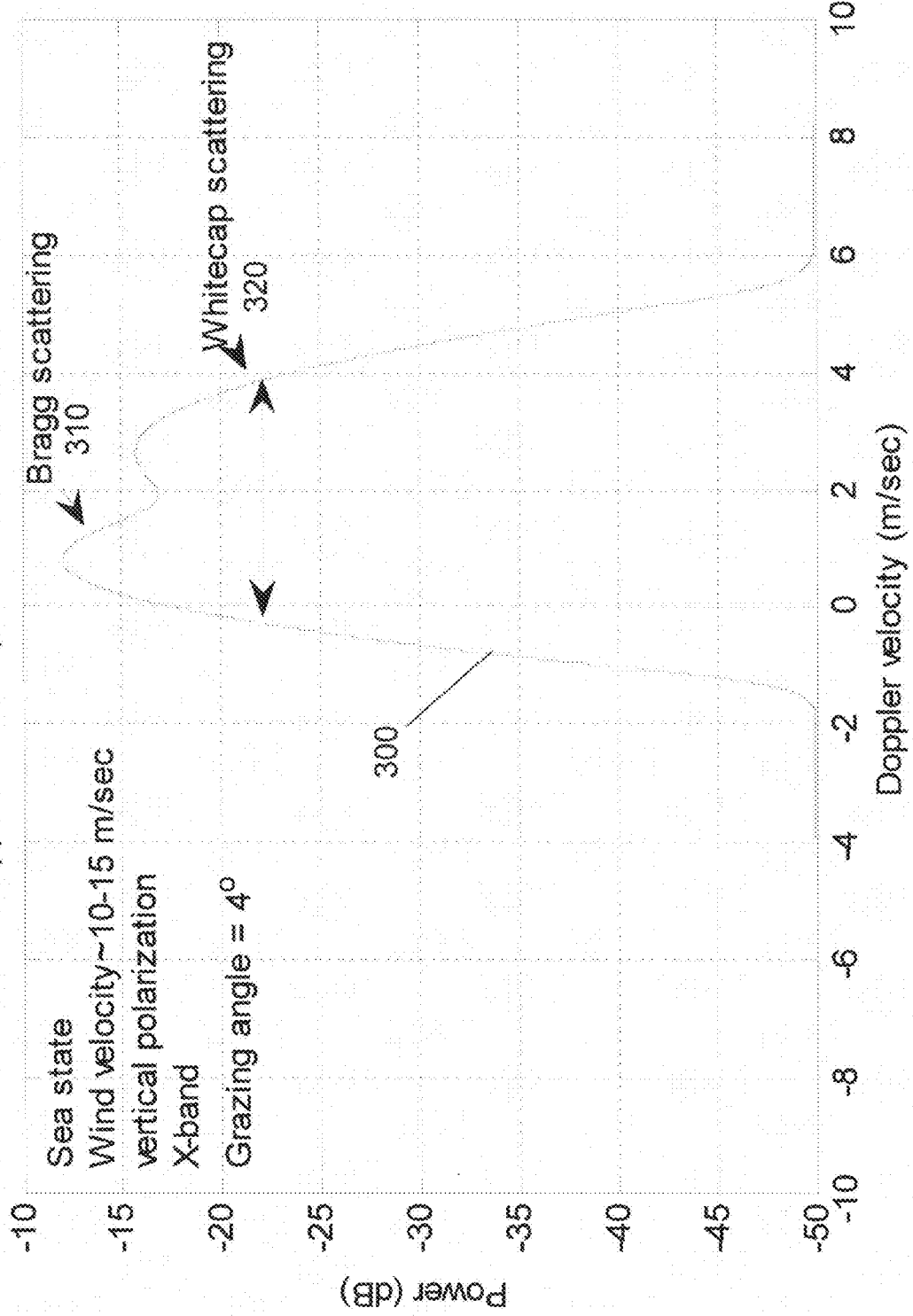
FIG. 6 is a graph of the Doppler power spectrum of sea clutter returns according to an embodiment of the present invention.

FIG. 6 is a graph of the Doppler power spectrum 300 of sea clutter returns according to an embodiment of the present invention.

Referring to FIG. 6, the x-axis represents Doppler (radial) velocity, in meters/second (m/sec), and the y-axis represents the Doppler power (signal strength) in decibels (dB). The wind velocity is approximately 10-15 m/sec and the grazing angle (angle between the radar beam and the surface) is 4°. For typical scenarios, wind velocity is around 10 m/sec, and the sea clutter spectrum extends to a few hundred Hertz (Hz). In addition, the time decorrelation is about 10 msec. Two scattering effects in the Doppler power spectrum 300 are apparent. The first is the relatively high-powered Bragg scattering 310 taking place at about 1 m/sec. The other is the more moderately powered whitecap scattering 320 showing up between 0 m/sec and 4 m/sec.

Figure 7:
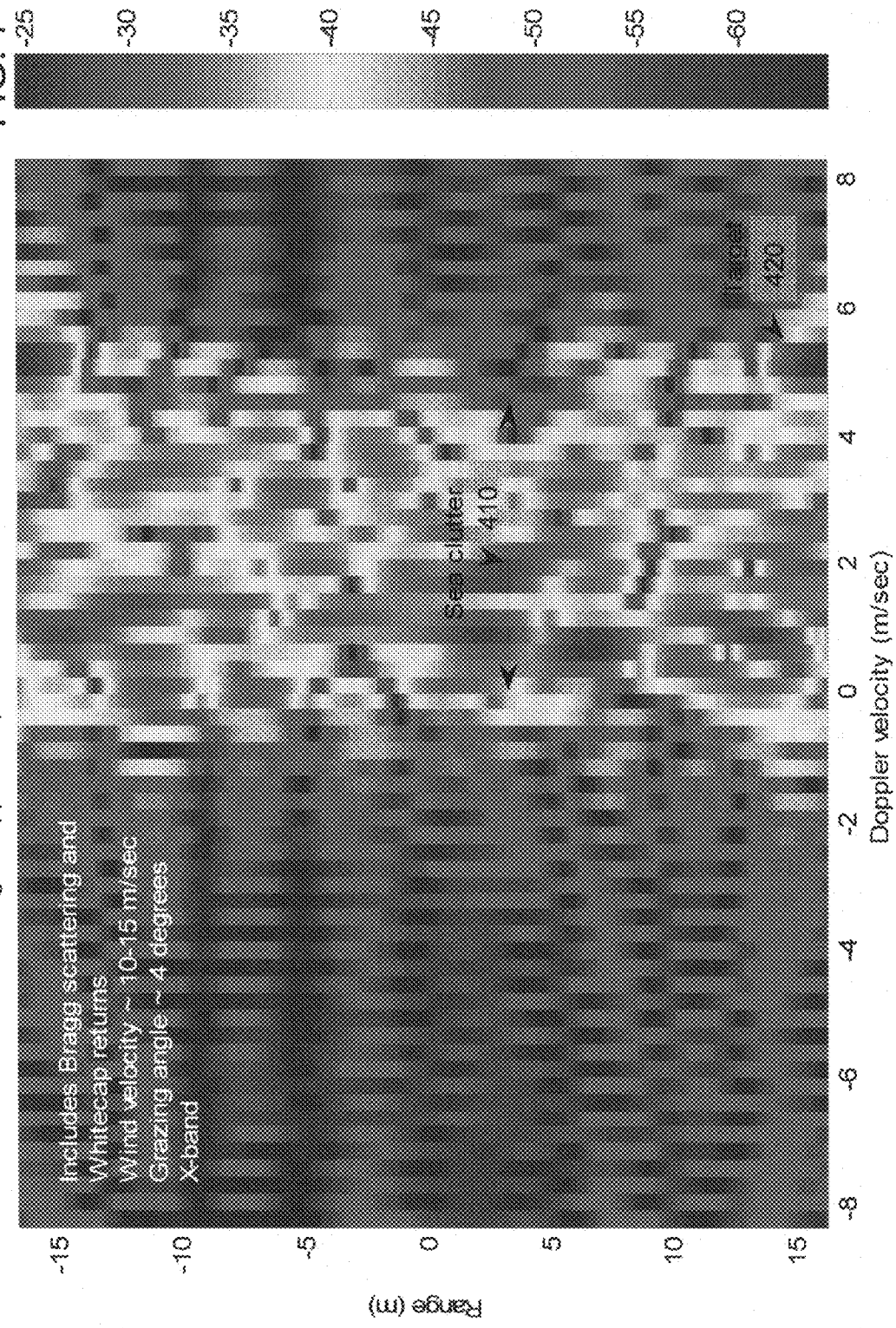
FIG. 7 is a corresponding range/Doppler map (in color) of the sea clutter returns of the embodiment used to produce FIG. 6 together with an added non-dispersive target.

FIG. 7 is a corresponding range/Doppler map (in color) of the sea clutter returns (Bragg scattering and whitecap scattering) of the embodiment used to produce FIG. 6 together with an added non-dispersive target.

Referring to FIG. 7, the x-axis represents Doppler velocity (m/sec) while the y-axis represents range (m). In addition, the corresponding coordinates are colored (or shaded) by their magnitude. The sea clutter 410 shows up as a band of relatively high magnitude, while the target 420 shows up in the lower right having the highest magnitude.

Figure 8:
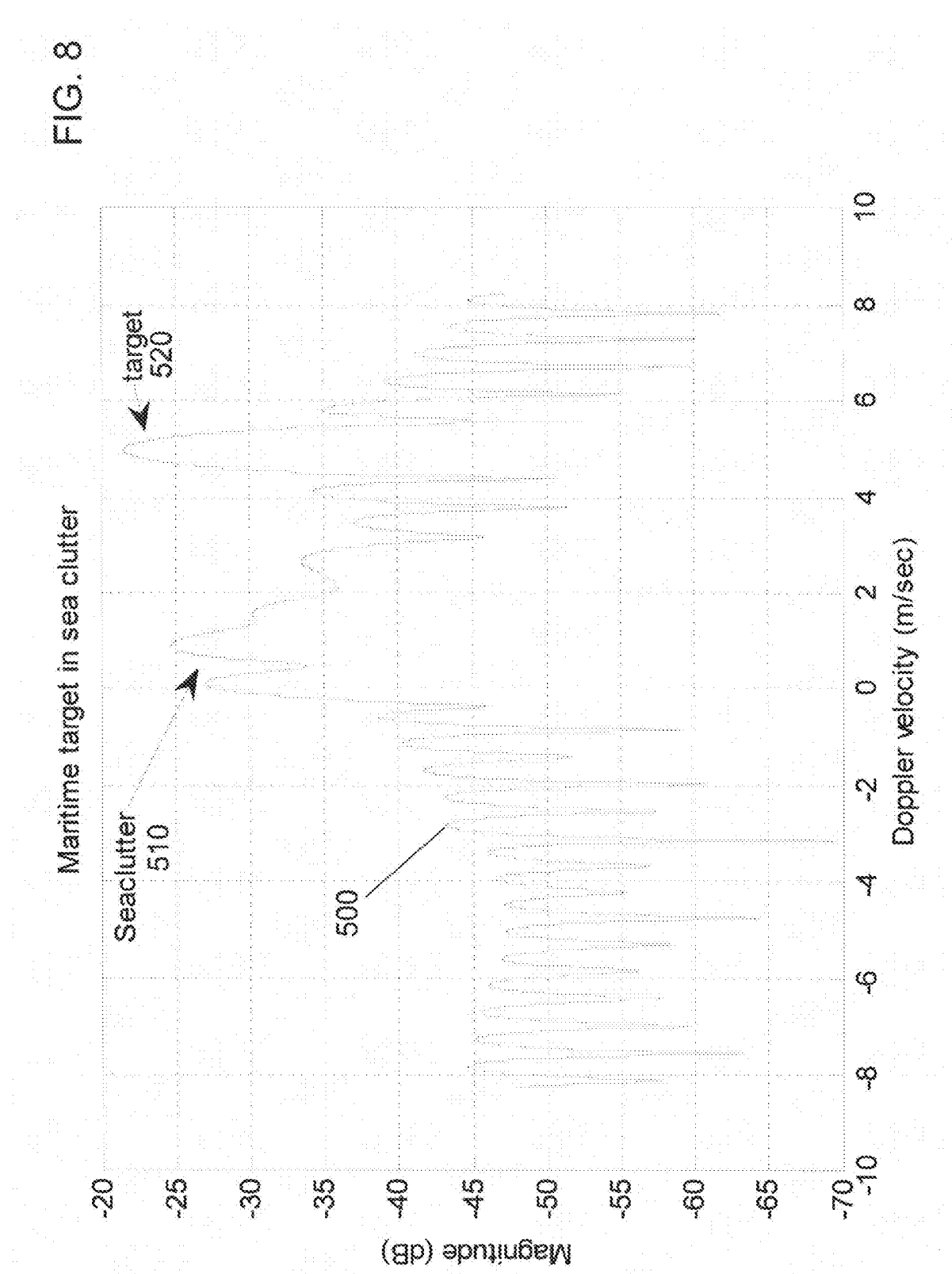
FIG. 8 is a corresponding magnitude/Doppler graph including target and sea clutter returns of the embodiment used to produce FIG. 7.

FIG. 8 is a corresponding magnitude/Doppler graph 500 including target and sea clutter returns of the embodiment used to produce FIG. 7.

Referring to FIG. 8, the x-axis represents Doppler velocity while the y-axis represents signal magnitude. The resulting spectrum 500 has three relative maxima, the first 510 representing sea clutter returns centered around 1 m/sec of Doppler velocity, and the second 520 representing the target (at around 5 m/sec).

Figure 9:
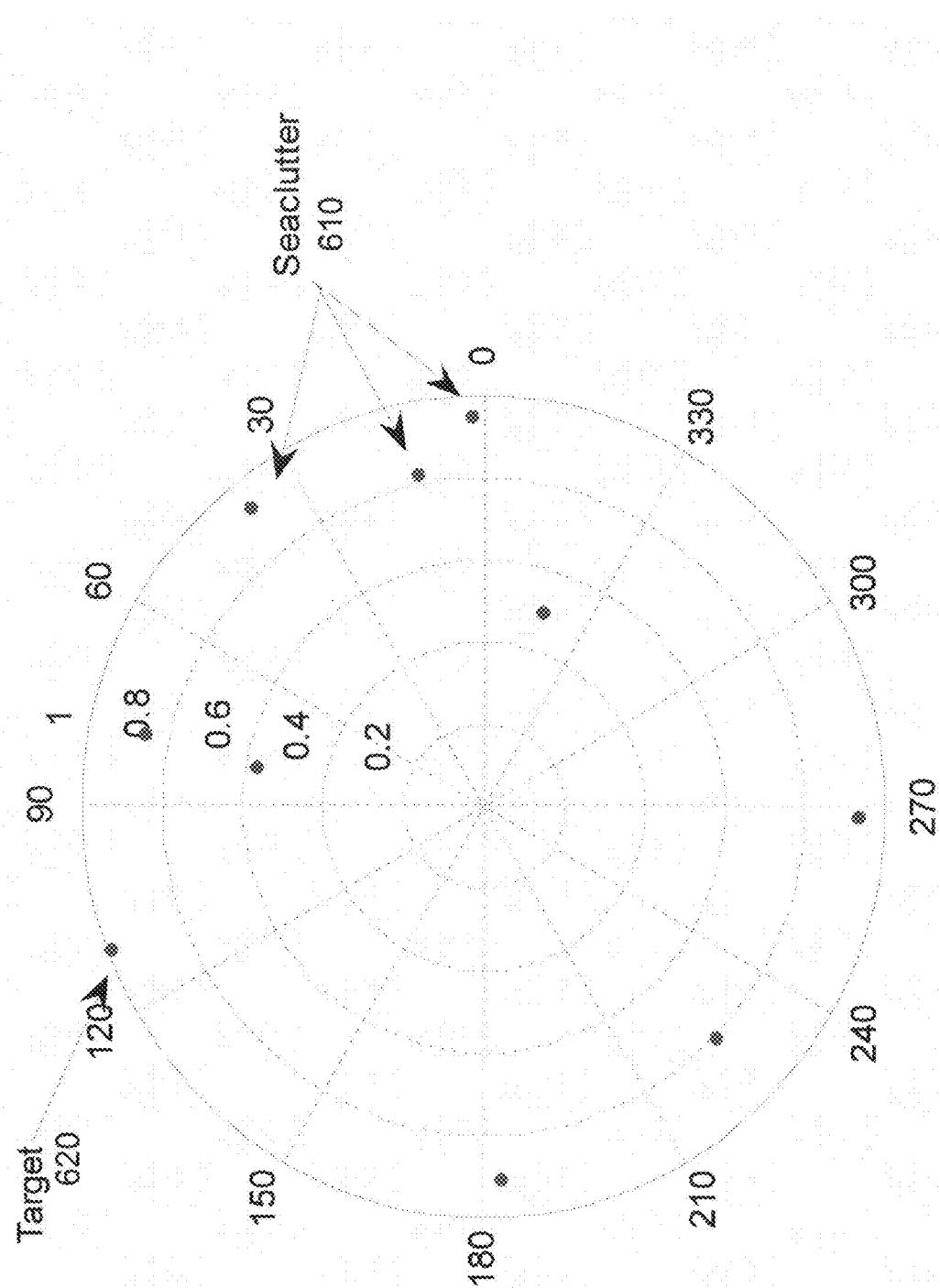
FIG. 9 is a unit circle plot of the different modes from the embodiment used to produce FIG. 7.

FIG. 9 is a unit circle plot of the different modes (roots of the linear prediction coefficient polynomial) from the embodiment used to produce FIG. 7.

Referring to FIG. 9, the different modes (roots) show up at different distances from the origin between 0 and 1. Most of the modes, such as clutter modes 610, are interior of the unit circle and represent sea clutter. On the other hand, target modes, such as target mode 620, are on the unit circle.

Rain Clutter

Weather clutter, which is mainly rain clutter, produces a volumetric return signal. Radar returns from a range resolution cell can be modeled as a stochastic process with a mean equal to its Doppler velocity. The spread of the Doppler spectrum depends on factors such as wind velocity and turbulence within the volume return, and can be modeled as the inverse of a cubic function. The time decorrelation is usually small, around 10-15 msec. The rain return reflectivity is also a function of the wavelength and the rainfall rate. The effective RCS from rain clutter can be from −5 dBsm to 5 dBsm.

Figure 10:
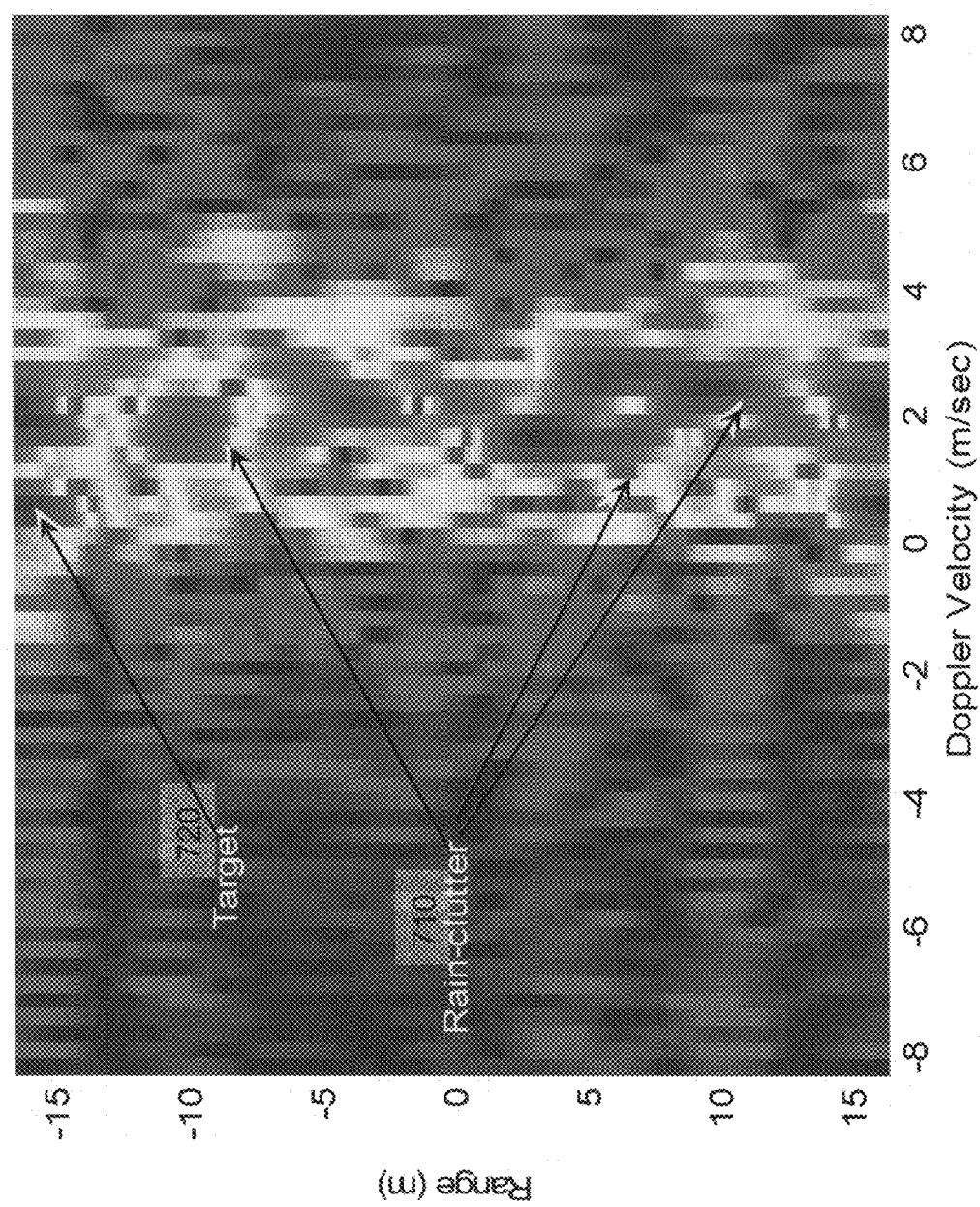
FIG. 10 is a range/Doppler map (in color) of a target in rain clutter returns according to an embodiment of the present invention.
Figure 11:
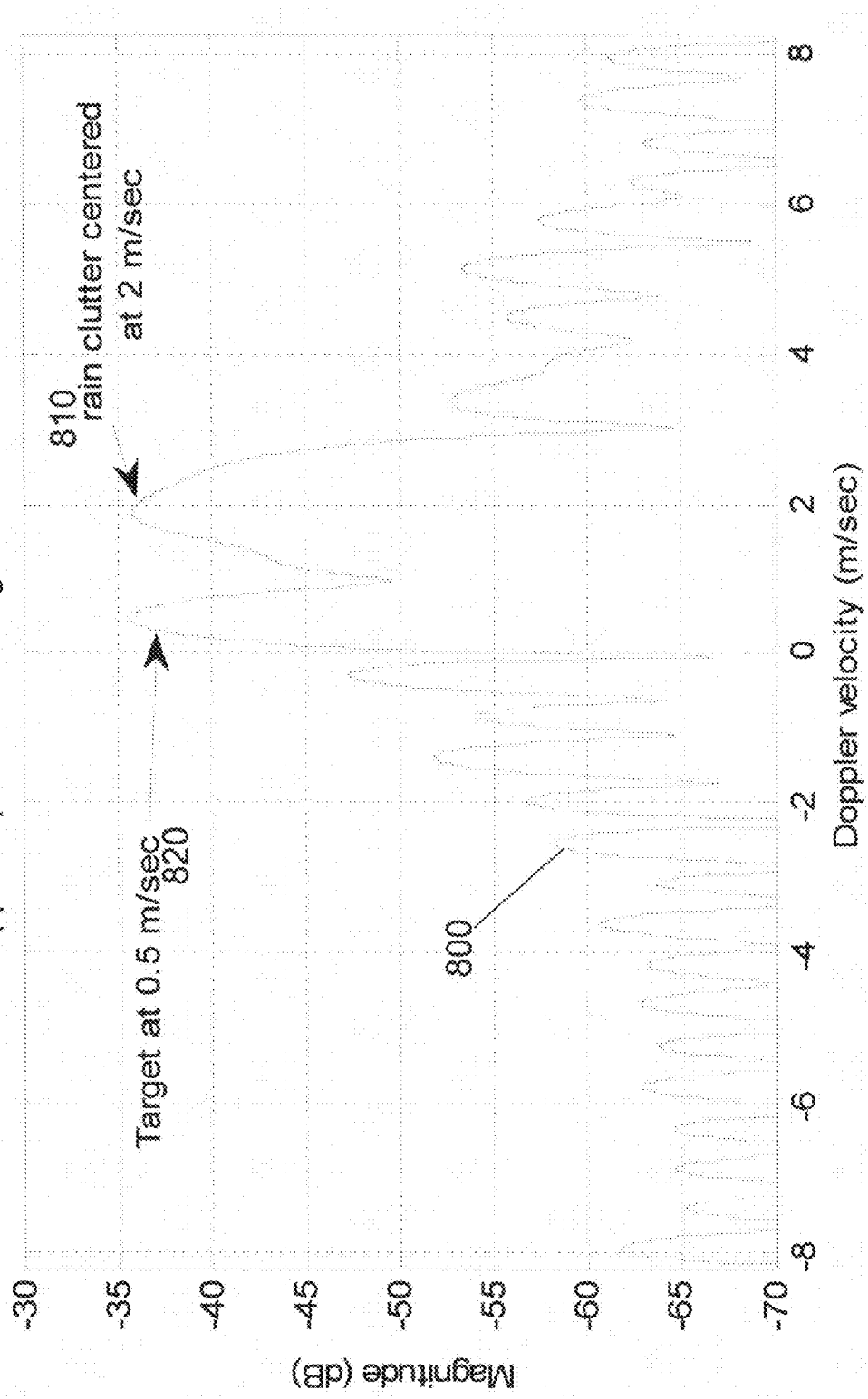
FIG. 11 is a corresponding magnitude/Doppler graph including target and rain clutter returns of the embodiment used to produced FIG. 10.
Figure 12:
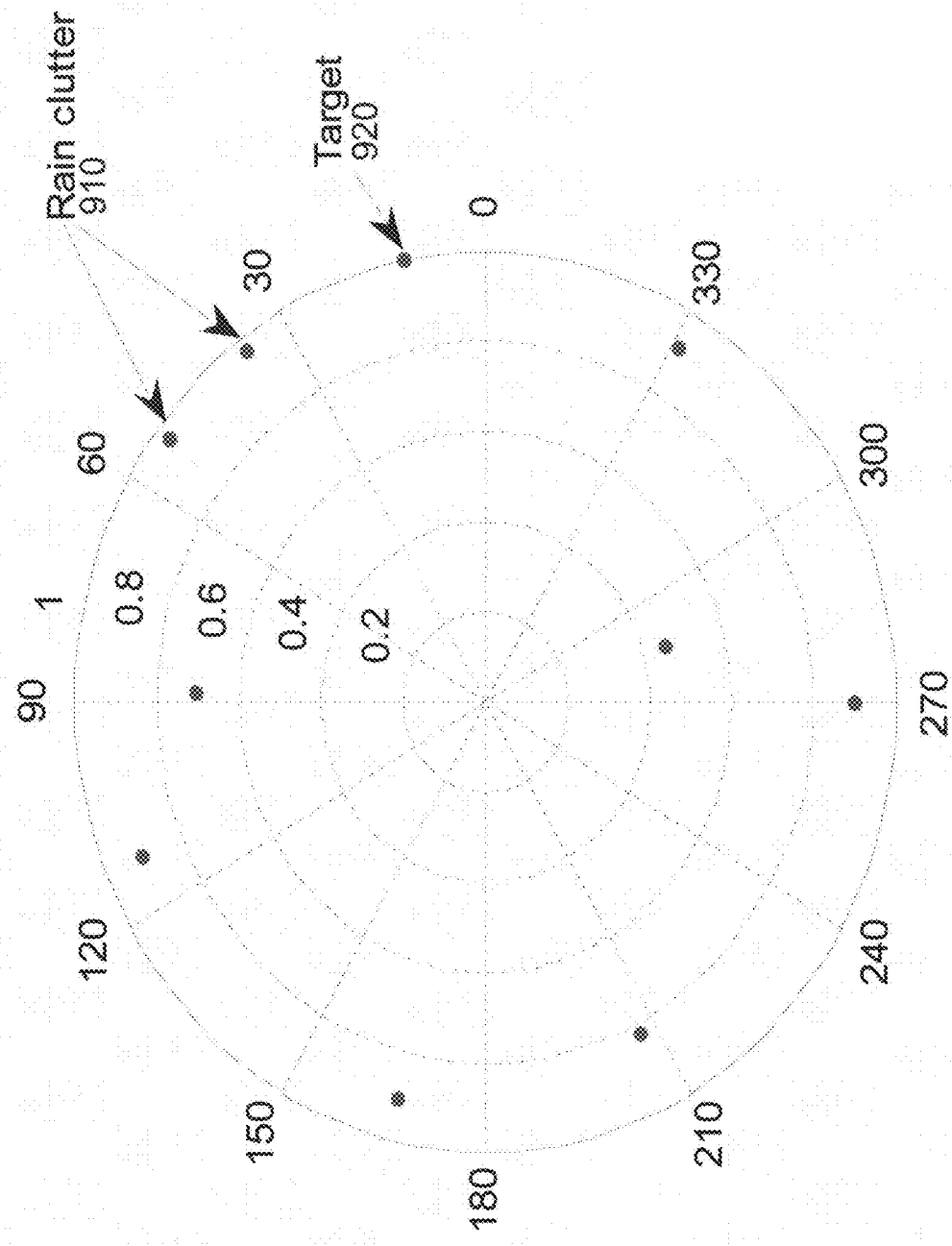
FIG. 12 is a unit circle plot of the different modes from the embodiment used to produce FIG. 10.

FIGS. 10-12 represent similar graphs to those used in FIGS. 7-9, respectively, only directed to a rain clutter environment. Accordingly, descriptions of similar aspects (such as axes) will not be repeated.

FIG. 10 is a range/Doppler map (in color) of a target in rain clutter returns according to an embodiment of the present invention. Referring to FIG. 10, the rain clutter 710 shows up as a band of relatively high magnitude and a Doppler velocity of around 2 m/sec, while the target 720 shows up in the upper center (at about 0.5 m/sec Doppler velocity) and having the highest magnitude.

FIG. 11 is a corresponding magnitude/Doppler graph 800 including target and rain clutter returns of the embodiment used to produce FIG. 10. Referring to FIG. 11, the resulting spectrum 800 has two relative maxima, the first 810 representing rain clutter returns centered around 2 m/sec of Doppler velocity, and the second 820 representing the target (at around 0.5 m/sec).

FIG. 12 is a unit circle plot of the different modes from the embodiment used to produce FIG. 10. Referring to FIG. 12, a similar phenomenon to that seen in FIG. 9 can be seen. The rain clutter modes 910 are those modes on the interior of the unit circle, while the target mode 920 is on the unit circle.

Bird Clutter

Bird radar returns can be characterized by the modulation of their wings flapping. The period and amplitude of this modulation may identify the bird type and even help to get rid of this signature. For aspect angles near broadside to the radar line of sight, the wings dominate the radar return, while at angles off-broadside, the bird's body dominates the signature. The bird body RCS is typically from −15 to −30 dBsm while the bird wing RCS can be 10 dBsm higher than that. Returns from a flock of birds can increase the effective RCS considerably and further contaminate the Doppler spectrum due to their wings flapping. The flock can have decorrelation over a small dwell because of slightly different Doppler velocities and body orientations.

Clutter Excision

Figure 13:
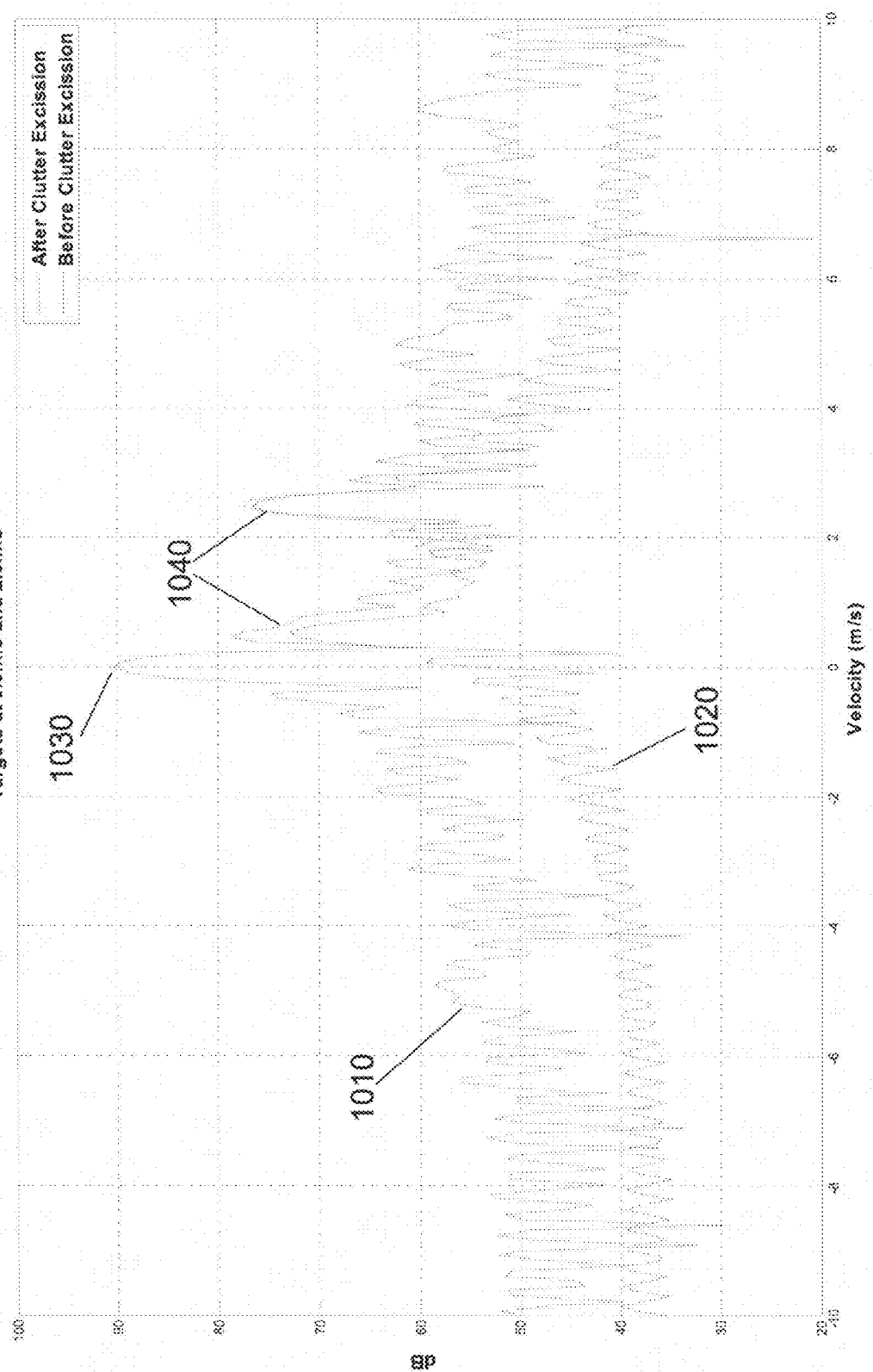
FIG. 13 is a color graph of two power spectral densities, before and after clutter excision, according to an embodiment of the present invention.

FIG. 13 is a color graph of two power spectral densities 1010 and 1020, before and after clutter excision, respectively, according to an embodiment of the present invention. For the Doppler spectrum shown in FIG. 13, the underlying radar return signals include dispersive and stationary ground clutter, and are obtained from a radar platform moving at 10 m/sec and illuminating the ground at a direction normal to its line of motion.

Referring to FIG. 13, the x-axis represents Doppler velocity (in m/sec), while the y-axis represents signal power (in dB). The top power spectral density 1010 (in red) is before clutter excision. For example, curve 1010 has a large maximum 1030 at 0 m/sec (zero Doppler) representing stationary clutter. After determining the modes, clutter excision is performed, which removes those samples associated with clutter (e.g., corresponding to dispersive modes inside the unit circle or non-dispersive modes at zero Doppler frequency). The bottom power spectral density 1020 (in blue) is after this clutter excision. Clutter excision leaves the two targets 1040 (at 0.5 m/sec and 2.5 m/sec) at similar strengths to what they were before excision, while significantly reducing the signal strength of the remaining spectrum.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method of target discrimination and identification, on a computer comprising a central processing unit (CPU) and a non-volatile storage device, from a radar signal comprising a plurality of radar return signals, the method comprising:
    modeling, on the computer, the radar return signals by linear prediction to produce linear prediction equations;
    solving, on the computer, the linear prediction equations by the Burg algorithm to produce linear prediction coefficients for a linear prediction coefficient polynomial;
    computing, on the computer, roots of the linear prediction coefficient polynomial to produce scattering modes;
    computing, on the computer, a proximity of each of the scattering modes to a unit circle;
    computing, on the computer, a pseudoinverse of a Doppler phase steering matrix;
    computing, on the computer, a complex envelope for each mode of the scattering modes using the pseudoinverse of the Doppler phase steering matrix; and
    selecting, on the computer, target scattering modes from among the scattering modes based on the proximity of the mode to the unit circle and the complex envelope of the mode.

2. The method of claim 1, further comprising selecting, on the computer, target radar return signals from among the radar return signals that correspond to the target scattering modes, to produce cleansed radar return signals.

3. The method of claim 2, further comprising reconstructing, on the computer, the radar signal to include only the cleansed radar return signals.

4. The method of claim 1, further comprising computing, on the computer, a proximity of each of the scattering modes to a zero Doppler frequency, wherein the selecting of the target scattering modes is further based on the proximity of the mode to the zero Doppler frequency.

5. The method of claim 1, wherein the computing of the roots of the linear prediction coefficient polynomial comprises approximating the roots with a fast Fourier transform.

6. The method of claim 5, wherein the selecting of the target scattering modes based on the proximity of the mode to the unit circle comprises approximating the proximity of the mode to the unit circle by applying a linear approximation about a respective one of the approximated roots.

7. The method of claim 1, wherein the selecting of the target scattering modes based on the proximity of the mode to the unit circle comprises basing the selecting on whether a distance of the mode to the unit circle is less than a first threshold value.

8. The method of claim 7, wherein the selecting of the target scattering modes based on the complex envelope of the mode comprises basing the selecting on whether the complex envelope is greater than a second threshold value.

9. The method of claim 8, further comprising not selecting those scattering modes that correspond to a zero Doppler frequency when the radar signal comprises stationary clutter radar return signals.

10. The method of claim 1, wherein the modeling of the radar return signals is done in a slow time domain.

11. The method of claim 1, wherein the modeling of the radar return signals is done in a fast frequency domain.

12. A system for target discrimination and identification from a radar signal comprising a plurality of radar return signals, the system comprising:
- a processor;
- a non-volatile storage device for storing the radar return signals; and
- computer-readable instructions for executing on the processor, the instructions constituting signal processing algorithms for discriminating between dispersive and non-dispersive scatterers from the radar signal, the algorithms configured to:
  - model the radar return signals by linear prediction to produce linear prediction equations;
  - solve the linear prediction equations by the Burg algorithm to produce linear prediction coefficients for a linear prediction coefficient polynomial;
  - compute roots of the linear prediction coefficient polynomial to produce scattering modes;
  - compute a proximity of each of the scattering modes to a unit circle;
  - compute a pseudoinverse of a Doppler phase steering matrix;
  - compute a complex envelope for each mode of the scattering modes using the pseudoinverse of the Doppler phase steering matrix; and
  - select target scattering modes from among the scattering modes based on the proximity of the mode to the unit circle and the complex envelope of the mode.

13. The system of claim 12, wherein the algorithms are further configured to select target radar return signals from among the radar return signals that correspond to the target scattering modes, to produce cleansed radar return signals.

14. The system of claim 13, wherein the algorithms are further configured to reconstruct the radar signal to include only the cleansed radar return signals.

15. The system of claim 12, wherein the algorithms are further configured to:
- compute a proximity of each of the scattering modes to a zero Doppler frequency; and
- further select the target scattering modes based on the proximity of the mode to the zero Doppler frequency.

16. The system of claim 12, wherein the algorithms are further configured to approximate the roots of the linear prediction coefficient polynomial using a fast Fourier transform.

17. The system of claim 16, wherein the algorithms are further configured to approximate the proximity of the mode to the unit circle by applying a linear approximation about a respective one of the approximated roots.

18. A method of fast target discrimination, on a signal processor, from a linear prediction coefficient polynomial, the method comprising:
- approximating, on the signal processor, roots of the linear prediction coefficient polynomial using a fast Fourier transform.

19. The method of claim 18, further comprising approximating, on the signal processor, proximities of the approximated roots to a unit circle by applying a linear approximation about each of the approximated roots.

20. The method of claim 19, further comprising selecting, on the signal processor, approximated roots whose approximated proximities to the unit circle are less than a first threshold value.

* * * * *